United States Patent
Yang et al.

(10) Patent No.: US 11,209,843 B1
(45) Date of Patent: Dec. 28, 2021

(54) CONTROL METHOD FOR FLEXIBLE CARBON CANTILEVER BEAM ACTUATED BY SMART MATERIAL

(71) Applicant: INSTITUTE OF AUTOMATION, CHINESE ACADEMY OF SCIENCES, Beijing (CN)

(72) Inventors: Hongjun Yang, Beijing (CN); Min Tan, Beijing (CN); Zengguang Hou, Beijing (CN); Junzhi Yu, Beijing (CN); Long Cheng, Beijing (CN); Zhengxing Wu, Beijing (CN); Wei He, Beijing (CN); Zhijie Liu, Beijing (CN); Tairen Sun, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/372,554

(22) Filed: Jul. 12, 2021

(30) Foreign Application Priority Data

Dec. 15, 2020 (CN) .......................... 202011473843.5

(51) Int. Cl.
*G05D 17/02* (2006.01)
*G06F 17/11* (2006.01)
(Continued)

(52) U.S. Cl.
CPC .............. *G05D 17/02* (2013.01); *C08J 5/042* (2013.01); *G01L 1/048* (2013.01); *G06F 17/11* (2013.01)

(58) Field of Classification Search
None
See application file for complete search history.

(56) References Cited

U.S. PATENT DOCUMENTS 7,361,430 B1 * 4/2008 Gennett ............... B81B 3/0021
  429/188
9,130,154 B2 * 9/2015 Biso .................... H01L 41/0906
(Continued)

FOREIGN PATENT DOCUMENTS

CN       103869702 A     6/2014
CN       108181836 A     6/2018
(Continued)

OTHER PUBLICATIONS

Jian Mu, et al., Simulation Research on Active Vibration Control of Smart Flexible Beam Based on ANSYS, 2005, pp. 130-131, No. 2.

*Primary Examiner* — Andre J Allen
*Assistant Examiner* — Jermaine L Jenkins
(74) *Attorney, Agent, or Firm* — Bayramoglu Law Offices LLC

(57) ABSTRACT

A control method, system and device for a flexible carbon cantilever beam actuated by a smart material is provided. The new control method, system and device aims to solve the problems of control overflow and instability that are likely to occur in the distributed parameter system constructed in the prior art. The method includes: acquiring an elastic displacement of the flexible carbon cantilever beam in real time as input data; and obtaining, based on the input data, a control torque through a distributed parameter model constructed in advance, and performing vibration control on the flexible carbon cantilever beam. The new control method, system and device improves the control accuracy and stability of the distributed parameter system.

19 Claims, 3 Drawing Sheets

Acquiring an elastic displacement of the flexible carbon cantilever beam in real time as input data; and — S10

Obtaining, based on the input data, a control torque through a distributed parameter model constructed in advance, and performing vibration control on the flexible carbon cantilever beam. — S20

(51) Int. Cl.
   *G01L 1/04*   (2006.01)
   *C08J 5/04*   (2006.01)

(56) References Cited

U.S. PATENT DOCUMENTS 10,937,598 B2 * 3/2021 Yuge .................... H05K 1/0277
2005/0138880 A1   6/2005 Martineau

FOREIGN PATENT DOCUMENTS

| CN | 108287475 A | 7/2018 |
| CN | 108388136 A | 8/2018 |
| CN | 108714896 A | 10/2018 |
| CN | 109940613 A | 6/2019 |
| CN | 210271424 U | 4/2020 |
| CN | 111360830 A | 7/2020 |

\* cited by examiner

CONTROL METHOD FOR FLEXIBLE CARBON CANTILEVER BEAM ACTUATED BY SMART MATERIAL

CROSS REFERENCE TO THE RELATED APPLICATIONS

This application is based upon and claims priority to Chinese Patent Application No. 202011473843.5, filed on Dec. 15, 2020, the entire contents of which are incorporated herein by reference.

TECHNICAL FIELD

The present invention belongs to the technical field of distributed parameter system control, and specifically relates to a control method, system and device for a flexible carbon cantilever beam actuated by a smart material.

BACKGROUND

In recent years, the kinetic modeling of distributed parameter systems has attracted the attention of many researchers. It is very important to accurately describe the kinetic model of the system and design a reasonable system control method. The existing model of distributed parameter systems mostly uses lumped parameter methods, such as a hypothetical modal method and a finite element (FE) method. These methods ignore the high-order modes in the system, and obtain a simplified model of the lumped parameter system to make the design of the controller simpler. However, the model can easily cause subsequent problems such as the observer and controller overflow, which will make the control unstable and pose great safety hazards.

The flexible carbon cantilever beam is a typical distributed parameter system with significant nonlinearity and coupling characteristics. The movement process of the flexible carbon cantilever beam involves a wide range of overall movement combined with local elastic deformation. In practical applications, a sheet-like smart actuator is often attached to the surface of the flexible carbon cantilever beam to suppress the elastic deformation. In view of the flexible carbon cantilever beam with the ionic polymer-metal composite (IPMC) attached to the surface, the present invention innovatively proposes an accurate modeling and control method for a distributed parameter system with a smart actuator and a flexible mechanism coupled.

SUMMARY

In order to solve the above problems in the prior art, that is, to solve the problems of control overflow and instability that are likely to occur in the lumped parameter system constructed in the prior art, a first aspect of the present invention proposes a control method for a flexible carbon cantilever beam actuated by a smart material. The method includes:

S10: acquiring an elastic displacement of the flexible carbon cantilever beam in real time as input data; and S20: obtaining, based on the input data, a control torque through a distributed parameter model constructed in advance, and performing vibration control on the flexible carbon cantilever beam.

A method for constructing the distributed parameter model includes:

A10: calculating a tip rotation based on a displacement of one end of the flexible carbon cantilever beam whose surface is attached by a smart material strip which will be bent due to an excitation voltage applied and a length of the smart material strip, and constructing a linear relationship model between the excitation voltage and the tip rotation through a black box model;

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip;

A30: calculating a kinetic energy, an elastic potential energy and a virtual work of the flexible carbon cantilever beam according to the kinetic model of the smart material strip, where the virtual work is done by a non-conservative force including no damping force, and constructing, in combination with a Hamilton's principle, an undamped distributed parameter model of the flexible carbon cantilever beam as a first model; and A40: calculating a virtual work done by the non-conservative force plus a viscous damping force and a structural damping force on the flexible carbon cantilever beam, and constructing, in combination with the first model, a damped distributed parameter model as a final distributed parameter model.

In some preferred implementations, the tip rotation is calculated as follows:

$$\theta = 2\tan^{-1}\frac{d}{l}$$

where, $\theta$ represents the tip rotation, d represents the tip displacement, and l represents the length of the smart material strip.

In some preferred implementations, the kinetic model of the smart material strip is:

M=Kv $K=EI_c k_1/l$ where, M represents a torque output by the kinetic model of the smart material strip, v represents the excitation voltage, $EI_c$ represents a bending stiffness of the smart material strip, and $k_1$ is a set constant.

In some preferred implementations, the undamped distributed parameter model of the flexible carbon cantilever beam is:

$\rho(x)\ddot{w}(x,t)+[EI(x)w_{xx}(x,t)]_{xx}=[M(t)R(x)]_{xx}$ $EI(x)=EI_b+EI_c \cdot R(x)$ $$R(X) = \begin{cases} 0 & x < l_1 \text{ or } x \geq l_2 \\ 1 & l_1 \leq x < l_2 \end{cases}$$

where, $\rho(x)$ represents a unit mass density at a point x on the flexible carbon cantilever beam; $EI_b$ and $EI_c$ represent a bending stiffness of the flexible carbon cantilever beam and a bending stiffness of the smart material strip, respectively; M(t) represents a torque output by the kinetic model of the smart material strip at a moment t; $\ddot{w}(x,t)$ represents a second-order time derivative of an elastic displacement at the point x on the cantilever beam at the moment t; $w_{xx}(x,t)$ represents a second-order partial derivative of the elastic displacement at the point x on the cantilever beam at the moment t; [•]$_{xx}$ represents a second-order displacement partial derivative of •; $l_1$ or $l_2$ represents any position on the cantilever beam.

In some preferred implementations, a method for calculating the virtual work done by the non-conservative force plus the viscous damping force and the structural damping force on the flexible carbon cantilever beam in step A40 is as follows:

$$\delta W_{nc} = \int_0^L [M(t)R(x)]_{xx} \delta w(x,t) dx - D_1 \int_0^L \dot{w}(x,t) \delta w(x,t) dx - D_2 \int_0^L \dot{w}_x(x,t) \delta w(x,t) dx$$

where, $\delta W_{nc}$ represents a variation of the virtual work done by the non-conservative force plus the viscous damping force and the structural damping force; $D_1$ represents the viscous damping force; $D_2$ represents the structural damping force; $\delta w(x,t)$ represents a variation of the elastic displacement at the point x on the flexible carbon cantilever beam at the moment t; dx represents a differential of a displacement; $\dot{w}(x,t)$ represents a time derivative of the elastic displacement at the point x on the cantilever beam at the moment t; $\dot{w}_x(x,t)$ is a first-order partial derivative of $\dot{w}(x,t)$; L represents a length of the cantilever beam.

In some preferred implementations, the damped distributed parameter model is:

$$\rho(x)\ddot{w}(x,t) + [EI(x)w_{xx}(x,t)]_{xx} + D_1\dot{w}(x,t) + D_2\dot{w}_x(x,t) = [M(t)R(x)]_{xx}.$$

A second aspect of the present invention proposes a control system for a flexible carbon cantilever beam actuated by a smart material. The system includes an acquisition module and a control module.

The acquisition module is configured to acquire an elastic displacement of the flexible carbon cantilever beam in real time as input data.

The control module is configured to obtain, based on the input data, a control torque through a distributed parameter model constructed in advance, and perform vibration control on the flexible carbon cantilever beam.

A method for constructing the distributed parameter model includes:

A10: calculating a tip rotation based on a displacement of one end of the flexible carbon cantilever beam whose surface is attached by a smart material strip which will be bent due to an excitation voltage applied and a length of the smart material strip, and constructing a linear relationship model between the excitation voltage and the tip rotation through a black box model;

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip;

A30: calculating a kinetic energy, an elastic potential energy and a virtual work of the flexible carbon cantilever beam according to the kinetic model of the smart material strip, where the virtual work is done by a non-conservative force including no damping force, and constructing, in combination with a Hamilton's principle, an undamped distributed parameter model of the flexible carbon cantilever beam as a first model; and A40: calculating a virtual work done by the non-conservative force plus a viscous damping force and a structural damping force on the flexible carbon cantilever beam, and constructing, in combination with the first model, a damped distributed parameter model as a final distributed parameter model.

A third aspect of the present invention proposes a storage device. A plurality of programs are stored in the storage device, and the programs are configured to be loaded and executed by a processor to implement the aforementioned control method for the flexible carbon cantilever beam actuated by the smart material.

A fourth aspect of the present invention provides a processing device, including a processor and a storage device. The processor is configured to execute each program. The storage device is configured to store a plurality of programs. The programs are configured to be loaded and executed by the processor to implement the aforementioned control method for the flexible carbon cantilever beam actuated by the smart material.

The present invention has the following beneficial effects:

The present invention improves the control accuracy and stability of the distributed parameter system.

(1) In the modeling process of the present invention, the energy of the distributed parameter system is first analyzed, and then a partial differential equations (PDEs) model of the system is directly derived through the Hamilton's principle. The present invention does not ignore any vibration mode, such that the obtained distributed parameter model is accurate and complete and has strong versatility, which lays a model foundation for realizing a reliable and high-precision control method for the distributed parameter system.

(2) Compared with the lumped parameter models obtained by traditional methods such as hypothetical modal method and finite element (FE) method, the distributed parameter model of the present invention can effectively avoid unstable phenomena such as controller overflow. In addition, the controller has a low order, is easy to implement in engineering, and can be widely used in important fields that require flexible mechanical equipment operations such as medical treatment and aerospace. The present invention has very important theoretical value and application value because it is necessary to establish a distributed parameter model to achieve reliable and high-precision control in many applications,

BRIEF DESCRIPTION OF THE DRAWINGS

Other features, objectives and advantages of the present invention will become more apparent upon reading the detailed description of the non-restrictive embodiments made below with reference to the accompanying drawings.

DETAILED DESCRIPTION OF THE EMBODIMENTS

In order to make the objectives, technical solutions and advantages of the embodiments of the present invention clearer, the technical solutions in the embodiments of the present invention are described clearly and completely below with reference to the accompanying drawings. Apparently, the described embodiments are part rather than all of the embodiments. All other embodiments obtained by a person of ordinary skill in the art based on the embodiments of the present invention without creative efforts should fall within the protection scope of the present invention.

The present invention will be further described in detail below in conjunction with the accompanying drawings and embodiments. It should be understood that the specific embodiments described herein are merely intended to explain the present invention, rather than to limit the present invention. It should also be noted that, for convenience of description, only the parts related to the present invention are shown in the accompany drawings.

It should be noted that the embodiments in the present invention and features in the embodiments may be combined with each other if no conflict occurs.

Figure 1:
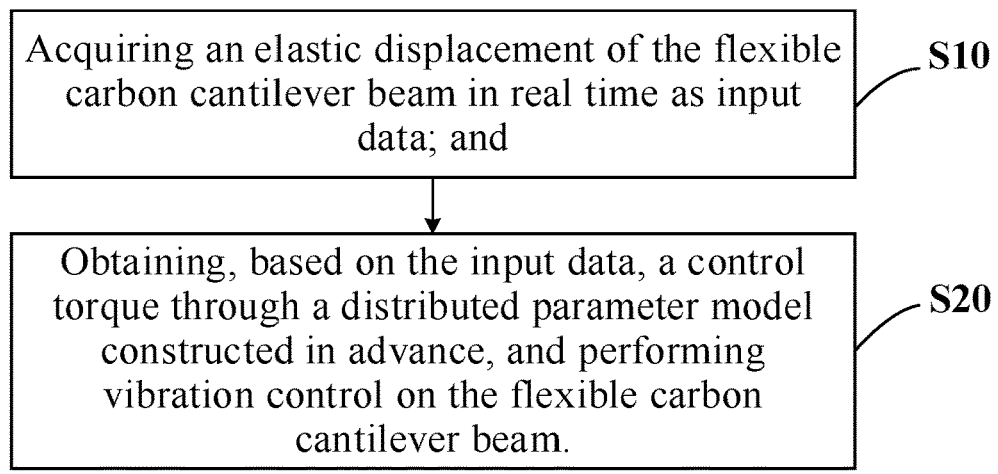
FIG. 1 is a flowchart of a control method for a flexible carbon cantilever beam actuated by a smart material according to an embodiment of the present invention.

The present invention provides a control method for a flexible carbon cantilever beam actuated by a smart material. As shown in FIG. 1, the control method includes the following steps:

S10: acquiring an elastic displacement of the flexible carbon cantilever beam in real time as input data.

S20: obtaining, based on the input data, a control torque through a distributed parameter model constructed in advance, and performing vibration control on the flexible carbon cantilever beam.

Specifically, a method for constructing the distributed parameter model includes:

A10: calculating a tip rotation based on a displacement of one end of the flexible carbon cantilever beam whose surface is attached by a smart material strip which will be bent due to an excitation voltage applied and a length of the smart material strip, and constructing a linear relationship model between the excitation voltage and the tip rotation through a black box model.

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip.

A30: calculating a kinetic energy, an elastic potential energy and a virtual work of the flexible carbon cantilever beam according to the kinetic model of the smart material strip, where the virtual work is done by a non-conservative force including no damping force, and constructing, in combination with a Hamilton's principle, an undamped distributed parameter model of the flexible carbon cantilever beam as a first model.

A40: calculating a virtual work done by the non-conservative force plus a viscous damping force and a structural damping force on the flexible carbon cantilever beam, and constructing, in combination with the first model, a damped distributed parameter model as the final distributed parameter model.

In order to more clearly describe the control method for a flexible carbon cantilever beam actuated by a smart material provided by the present invention, the steps in an embodiment of the present invention are described in detail below with reference to the accompanying drawings.

In the following embodiment, the construction process of the distributed parameter model is first described in detail, and then the process of acquiring the control torque in the control method for a flexible carbon cantilever beam actuated by a smart material is described in detail.

Figure 5:
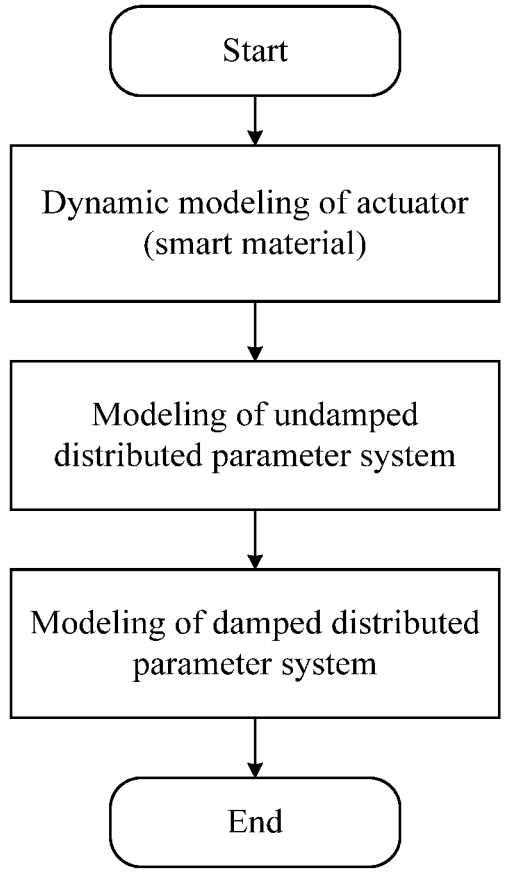
FIG. 5 is a flowchart of constructing a distributed parameter model according to an embodiment of the present invention.

1. The construction process of the distributed parameter model, as shown in FIG. 5, is as follows:

A10: calculating a tip rotation based on a displacement of one end of the flexible carbon cantilever beam whose surface is attached by a smart material strip which will be bent due to an excitation voltage applied and a length of the smart material strip, and constructing a linear relationship model between the excitation voltage and the tip rotation through a black box model.

Smart materials, also called intelligent materials, generally refer to new materials with smart features, which can perceive, analyze and judge the environment, and take certain measures to respond appropriately. In the present invention, the smart material is preferably ionic polymer-metal composite (IPMC), which is a new type of electrically activated smart material that features low density, high toughness, large deformation response, etc., and can be used as an actuator.

The flexible carbon cantilever beam is a typical distributed parameter system with significant nonlinearity and coupling characteristics. The movement process of the flexible carbon cantilever beam involves a wide range of overall movement combined with local elastic deformation. In practical applications, a sheet-like smart actuator is often attached to the surface of the flexible carbon cantilever beam to suppress the elastic deformation. In view of the flexible carbon cantilever beam with the IPMC attached to the surface, the present invention innovatively proposes an accurate modeling and control method for a distributed parameter system with a smart actuator and a flexible mechanism coupled.

Figure 3:
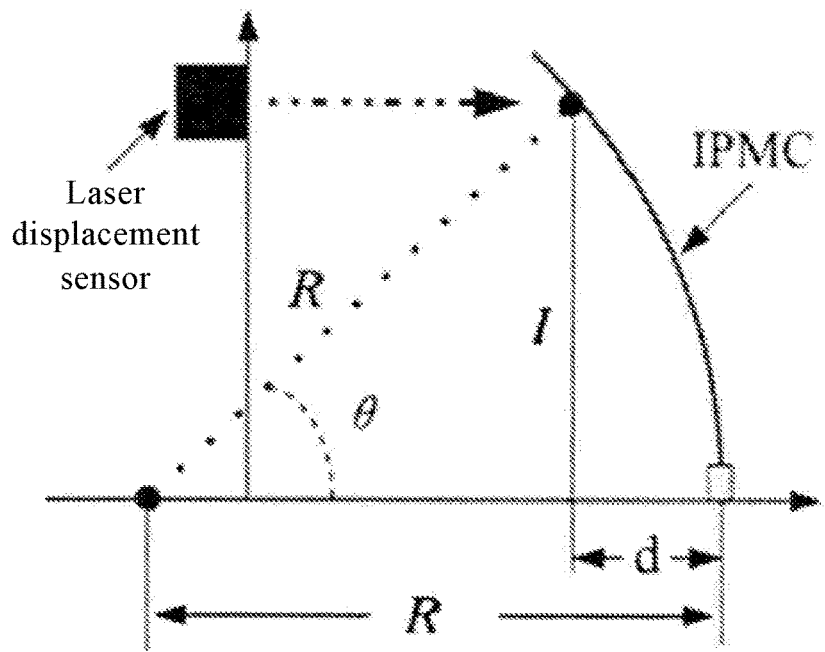
FIG. 3 shows a deformation of an ionic polymer-metal composite (IPMC) according to an embodiment of the present invention.

In this embodiment, the structure and actuation characteristics of the IPMC are first studied in detail, and then a black box model is used to model the actuation characteristics of the IPMC. When an excitation voltage is applied to one end of the IPMC, the IPMC produces a bending deformation, and it is observed to deform into an arc shape. The deformation is assumed to have an absolute arc shape in the modeling process, as shown in FIG. 3. The specific process is as follows:

The tip displacement d of the end of the IPMC strip after the bending due to the excitation voltage applied is measured by a laser displacement sensor. l is approximately equal to the length of the IPMC strip, and the tip rotation is calculated according to Eq. (1):

$$\theta = 2\tan^{-1}\frac{d}{l} \tag{1}$$

Then the linear relationship model between the excitation voltage v and the tip rotation θ is established through the black box model, as shown in Eq. (2):

$$\theta = k_1 v + k_2 \tag{2}$$

$k_1$ and $k_2$ are constants. The excitation voltage and the tip rotation (calculated from the tip displacement obtained from an experiment) are measured through experiments. $k_1$ and $k_2$ are calculated by using a method of least squares (LS).

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip.

In this embodiment, according to the mechanics of materials, the relationship between the curvature radius R of the neutral layer and the bending moment M when the beam is bent is:

$$M = EI_c / R \quad (3)$$

where, $EI_c$ is a bending stiffness of the IPMC. Since $\theta = 1/R$, the relationship between the bending moment M output by the IPMC and the excitation voltage v can be obtained through a series of conversions:

$$M = EI_c(k_1 c + k_2)/l \quad (4)$$

In order to simplify the complexity of the problem, the small constant term $EI_c k_2/l$ is ignored. According to Eq. (4), the relationship between the output bending moment and the excitation voltage is finally determined as:

$$M = Kv \quad (5)$$

where, $K = EI_c k_1 / l$. Thus, the mapping relationship between the excitation voltage and the torque of the smart material strip is obtained, and the kinetic model of the actuator (smart material or smart material strip) is established.

A30: calculating a kinetic energy, an elastic potential energy and a virtual work of the flexible carbon cantilever beam according to the kinetic model of the smart material strip, where the virtual work is done by a non-conservative force including no damping force, and constructing, in combination with a Hamilton's principle, an undamped distributed parameter model of the flexible carbon cantilever beam as a first model.

Figure 4:
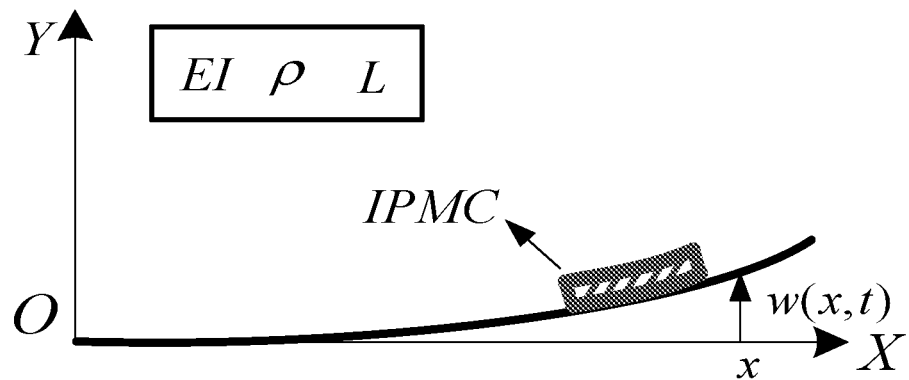
FIG. 4 shows a geometric model of a cantilever beam with an IPMC attached to a surface according to an embodiment of the present invention.

In this embodiment, a lightweight carbon strip (cantilever beam) with an IPMC strip attached to the surface and moving horizontally is used as the research object to solve the problem of modeling a distributed parameter system with significant nonlinearity and coupling characteristics. A simplified geometric kinetic model of the cantilever beam with the IPMC attached to the surface is shown in FIG. 4, where, XOY represents an inertial coordinate system. The definition of each parameter of the system is shown in Table 1.

TABLE 1

| Symbol | Description |
|---|---|
| $EI_b$ | Bending stiffness of cantilever beam |
| L | Length of cantilever beam |
| $\rho$ | Unit mass density of cantilever beam |
| w(x, t) | Elastic displacement of point x on the cantilever beam at moment t |

The distributed parameter modeling for the cantilever beam system is as follows. Regardless of the own damping of the cantilever beam, the system's kinetic energy $E_k$, elastic potential energy $E_p$ and virtual work $W_{nc}$ done by the non-conservative force are first expressed as follows:

The total kinetic energy of the system can be expressed as:

$$E_k = \frac{1}{2} \int_0^L \rho(x) \dot{w}^2(x, t) dx \quad (6)$$

where, $\rho(x) = \rho_b + \rho_c \cdot R(x)$; b and c represent the cantilever beam and the IPMC respectively; $\rho_b$, $\rho_c$ represent the unit mass density of the cantilever beam and the IPMC respectively; $\dot{w}^2(x,t)$ represents the square of the time derivative of the elastic displacement at the point x on the cantilever beam at the moment t; $R(x) = H(x-l_1) - H(x-l_2)$, where $l_1$ or $l_2$ represents any position on the cantilever beam, and $H(x)$ is a Heaviside function, namely:

$$H(X) = \begin{cases} 0 & X < 0 \\ 1 & x \geq 0 \end{cases}$$

$$R(X) = \begin{cases} 0 & X < l_1 \text{ or } x \geq l_2 \\ 1 & l_1 \leq x < l_2 \end{cases}$$

The elastic potential energy of the system can be expressed as:

$$E_p = \frac{1}{2} \int_0^L EI(x) w_{xx}^2(x, t) dx \quad (7)$$

where, $EI(x) = EI_b + EI_c \cdot R(x)$; $EI_b$ and $EI_c$ represent the bending stiffness of the flexible carbon cantilever beam and the bending stiffness of the IPMC strip respectively; $w_{xx}^2(x,t)$ represents the square of the second-order partial derivative of the elastic displacement at the point x on the cantilever beam at the moment t.

The virtual work done by the non-conservative force including no damping force is:

$$\delta w_{nc} = \int_0^L [M(t) R(x)]_{xx} \delta w(x, t) dx \quad (8)$$

where, $\delta W_{nc}$ represents the virtual work done by the non-conservative force, and here, it is the virtual work done by the non-conservative force including no damping force; M(t) represents the torque output by the kinetic model of the smart material strip at the moment t; $\delta w(x,t)$ represents the variation of the elastic displacement at the point x on the flexible carbon cantilever beam at the moment t; dx represents the differential of the displacement.

The Hamilton's principle is introduced:

$$\int_{t_1}^{t_2} (\delta E_k - \delta E_p + \delta W_{nc}) dt = 0 \quad (9)$$

where, $\delta E_k$ and $\delta E_p$ respectively represent variations of the kinetic energy and the potential energy of the system; $t_1$ and $t_2$ represent time variables to be integrated; dt represents the differential of time. Substituting Eqs. (6) to (8) into Eq. (9) leads to:

$$\int_{t_1}^{t_2} \delta E_k \, dt = \int_{t_1}^{t_2} \left[ \int_0^L \rho(x) \ddot{w}(x,t) \delta \dot{w}(x,t) dx \right] dt$$

$$= \int_0^L \int_{t_1}^{t_2} [\rho(x) \dot{w}(x,t) d\delta w(x,t) dx]$$

$$= \int_0^L [\rho(x) \dot{w}(x,t) \delta w(x,t)|_{t_1}^{t_2} -$$

$$\int_{t_1}^{t_2} \rho(x) \ddot{w}(x,t) \delta w(x,t) dt] dx$$

$$= -\int_{t_1}^{t_2} \int_0^L \rho(x) \ddot{w}(x,t) \delta w(x,t) dx dt$$

$$\int_{t_1}^{t_2} \delta E_p dt = \int_{t_1}^{t_2} \int_0^L EI(X) w_{xx}(x,t) \delta w_{xx}(x,t) dx dt$$

$$= \int_{t_1}^{t_2} [EI(X) w_{xx}(x,t) \delta w_x(x,t)|_0^L -$$

$$\int_0^L [EI(X) w_{xx}(x,t)]_x \delta dw(x,t)] dt$$

$$= \int_{t_1}^{t_2} EI(L) w_{xx}(L,t) \delta w_x(L,t) dt -$$

$$\int_{t_1}^{t_2} \{[EI(X) w_{xx}(x,t)]_x \delta w(x,t)|_0^L -$$

$$\int_0^L [EI(X) w_{xx}(x,t)]_{xx} \delta w(x,t)\} dt$$

$$= \int_{t_1}^{t_2} EI(L) w_{xx}(L,t) \delta w_x(L,t) dt -$$

$$\int_{t_1}^{t_2} [EI(L) w_{xx}(L,t)]_x \delta w(L,t) dt +$$

$$\int_{t_1}^{t_2} \int_0^L [EI(X) w_{xx}(x,t)]_{xx} \delta w(x,t) dx dt$$

$$\int_{t_1}^{t_2} \delta W_{nc} \, dt = \int_{t_1}^{t_2} \int_0^L [M(t)R(x)]_{xx} \delta w(x,t) dx dt$$

where, $\dot{w}(x,t)$ represents the time derivative of the elastic displacement at the point x on the cantilever beam at the moment t; $\ddot{w}(x,t)$ represents the second-order time derivative of the elastic displacement at the point x on the cantilever beam at the moment t; $w_{xx}(x,t)$ represents the second-order partial derivative of the elastic displacement at the point x on the cantilever beam at the moment t; EI(L) represents the bending stiffness of the system at a point L; $w_{xx}(L,t)$ represents the second-order partial derivative of the elastic displacement at the point L on the cantilever beam at the moment t; $w_x(L,t)$ represents the first-order partial derivative of the elastic displacement at the point L on the cantilever beam at the moment t; w(L,t) represents the elastic displacement at the point L on the cantilever beam at the moment t; $[\bullet]_x$ represents the first-order displacement partial derivative of •; the point L is a tail end of the cantilever beam.

Thus, Eq. (9) can be transformed into:

$$\int_{t_1}^{t_2} \int_0^L A \delta w(x,t) dx dt + \int_{t_1}^{t_2} B \delta w(L,t) dt + \int_{t_1}^{t_2} C \delta w_x(L,t) \, dt = 0 \quad (10)$$

$$A = -\rho(x) \ddot{w}(x,t) - [EI(x) w_x(x,t)]_{xx} + [M(t)R(x)]_{xx} \quad (11)$$

$$B = [EI(L) w_{xx}(x,t)]_x \quad (12)$$

$$C = EI(L) w_{xx}(L,t) \quad (13)$$

where, $w_x(x,t)$ represents the first-order partial derivative of the elastic displacement at the point x on the cantilever beam at the moment t; $w_{xx}(x,t)$ represents the second-order partial derivative of the elastic displacement at the point x on the cantilever beam at the moment t.

Since δw(x,t), δw(L,t) and $\delta w_x$(L,t) are all independent variations and non-linear related terms, Eq. (10) has a unique zero solution A=B=C=0 to ensure that Hamilton's principle expressed by Eq. (9) is established. Therefore, the distributed parameter model of the system is derived from Eqs. (11) to (13) as follows:

$$\rho(x) \ddot{w}(x,t) + [EI(x) w_{xx}(x,t)]_{xx} = [M(t)R(x)]_{xx} \quad (14)$$

Boundary Conditions:

$$w_{xx}(L,t) = 0, w_{xxx}(L,t) = 0 \quad (15)$$

where, $w_{xxx}$(L,t) represents a third-order partial derivative of the elastic displacement at the point L on the cantilever beam at the moment t.

The coordinate establishment method of the system shows that the other two boundary conditions are:

$$w(0,t) = 0, w_x(0,t) = 0 \quad (16)$$

where, w(0,t) represents an elastic displacement at an origin of the cantilever beam at the moment t; $w_x$(0,t) represents a first-order partial derivative of the elastic displacement at the origin of the cantilever beam at the moment t.

Thus, Eqs. (14) to (16) are the kinetic equations of the entire system without considering damping, where Eq. (14) is the partial differential bifurcation equation of the system, and Eqs. (15) and (16) are the boundary conditions of the system.

A40: calculating a virtual work done by the non-conservative force plus a viscous damping force and a structural damping force on the flexible carbon cantilever beam, and constructing, in combination with the first model, a damped distributed parameter model as the final distributed parameter model.

Any mechanical structure has structural damping during the vibration process, so when the dynamic performance of the mechanical structure is analyzed, it is necessary to consider the important influencing factor of damping. Considering that the cantilever beam system is damped, in the process of analyzing the system energy, it is necessary to add the viscous damping force and the structural damping force to the non-conservative force to do virtual work to the system.

Compared with the undamped case, the variation only changes in the work done by the non-conservative force to the system. In this embodiment, the virtual work done by the non-conservative force plus the viscous damping force and structural damping force can be expressed as:

$$\delta W_{nc} = \int_0^L [M(t)R(x)]_{xx} \delta w(x,t) dx - \quad (17)$$

$$D_1 \int_0^L \dot{w}(x,t) \delta w(x,t) dx - D_2 \int_0^L \dot{w}_x(x,t) \delta w(x,t) dx$$

where, $\dot{w}_x$(x,t) is the first-order partial derivative of $\dot{w}$(x, t); $D_1$>0 represents the viscous damping force, and $D_2$>0 represents the structural damping force. Then:

$$\int_{t_1}^{t_2} \delta W_{nc} dt = \int_{t_1}^{t_2} \int_0^L [M(t)R(x)]_{xx} \delta w(x,t) dx dt -$$
$$D_1 \int_{t_1}^{t_2} \int_0^L \dot{w}(x,t) \delta w(x,t) dx dt - D_2 \int_{t_1}^{t_2} \int_0^L \dot{w}_x(x,t) \delta w(x,t) dx dt$$

The rest of the energy remains unchanged. Again, based on Eq. (10) and the nonlinear correlation, the damped kinetic equation of the system can be derived as follows:

$$\rho(x)\ddot{w}(x,t) + [EI(x)w_{xx}(x,t)]_{xx} + D_1 \dot{w}(x,t) + D_2 \dot{w}_x(x,t) = [M(t)R(x)]_{xx} \quad (18)$$

$w(0,t)=0, w_x(0,t)=0, w_{xx}(L,t)=0, w_{xxx}(L,t)=0$. In this way, the damped distributed parameter model is obtained, that is, the final actual system model.

2. The control method for a flexible carbon cantilever beam actuated by a smart material S10: acquiring an elastic displacement of the flexible carbon cantilever beam in real time as input data.

In this embodiment, the elastic displacement of the flexible carbon cantilever beam at the moment t is acquired.

S20: obtaining, based on the input data, a control torque through a distributed parameter model constructed in advance, and performing vibration control on the flexible carbon cantilever beam.

In this embodiment, the elastic displacement is input to the damped distributed parameter model constructed above to obtain the control torque of the flexible carbon cantilever beam, so as to realize vibration control of the flexible carbon cantilever beam.

Figure 2:
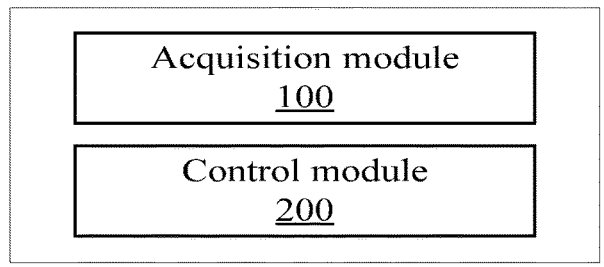
FIG. 2 is a block diagram of a control system for a flexible carbon cantilever beam actuated by a smart material according to an embodiment of the present invention.

A second embodiment of the present invention proposes a control system for a flexible carbon cantilever beam actuated by a smart material. As shown in FIG. 2, the system includes an acquisition module 100 and a control module 200.

The acquisition module 100 is configured to acquire an elastic displacement of the flexible carbon cantilever beam in real time as input data.

The control module 200 is configured to obtain, based on the input data, a control torque through a distributed parameter model constructed in advance, and perform vibration control on the flexible carbon cantilever beam.

Specifically, a method for constructing the distributed parameter model includes:

A10: calculating a tip rotation based on a displacement of one end of the flexible carbon cantilever beam whose surface is attached by a smart material strip which will be bent due to an excitation voltage applied and a length of the smart material strip, and constructing a linear relationship model between the excitation voltage and the tip rotation through a black box model.

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip.

A30: calculating a kinetic energy, an elastic potential energy and a virtual work of the flexible carbon cantilever beam according to the kinetic model of the smart material strip, where the virtual work is done by a non-conservative force including no damping force, and constructing, in combination with a Hamilton's principle, an undamped distributed parameter model of the flexible carbon cantilever beam as a first model.

A40: calculating a virtual work done by the non-conservative force plus a viscous damping force and a structural damping force on the flexible carbon cantilever beam, and constructing, in combination with the first model, a damped distributed parameter model as the final distributed parameter model.

Those skilled in the art should clearly understand that, for convenience and brevity of description, reference is made to corresponding processes in the above method embodiment for specific working processes of the system, and details are not described herein again.

It should be noted that the modeling system for the smart material-actuated distributed parameter system provided by the above embodiment is only described by taking the division of the above functional modules as an example. In practical applications, the above functions can be completed by different functional modules as required, that is, the modules or steps in the embodiment of the present invention are further decomposed or combined. For example, the modules of the above embodiment may be combined into one module, or may be further divided into multiple sub-modules to complete all or part of the functions described above. The names of the modules and steps involved in the embodiment of the present invention are only for distinguishing each module or step, and should not be regarded as improper limitations on the present invention.

A third embodiment of the present invention proposes a storage device. A plurality of programs are stored in the storage device, and the programs are configured to be loaded by a processor to implement the aforementioned control method for the flexible carbon cantilever beam actuated by the smart material.

A fourth embodiment of the present invention provides a processing device including a processor and a storage device. The processor is configured to execute each program. The storage device is configured to store a plurality of programs. The programs are configured to be loaded and executed by the processor to implement the aforementioned control method for the flexible carbon cantilever beam actuated by the smart material.

Those skilled in the art should clearly understand that, for convenience and brevity of description, reference is made to corresponding processes in the above method embodiment for specific working processes of the storage device and the processing device, and details are not described herein again.

Figure 6:
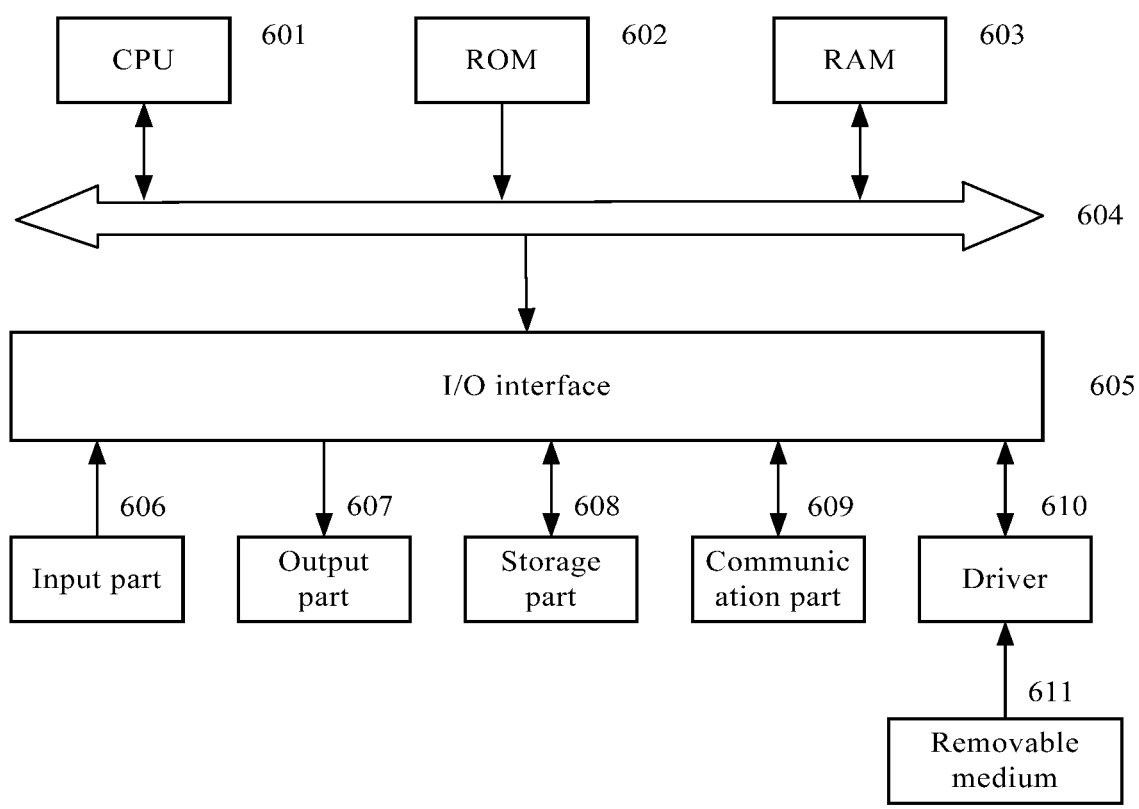
FIG. 6 is a structural diagram of a computer system of an electronic device suitable for implementing embodiments of the present invention.

FIG. 6 shows a structural diagram of a computer system of a server suitable for implementing the method, system and device embodiments of the present invention. The server shown in FIG. 6 is merely an example, and should not be conceived as a limitation to the functions and application range of the embodiments of the present invention.

As shown in FIG. 6, the computer system includes a central processing unit (CPU) 601, which can perform various suitable actions and processing according to a program in a read-only memory (ROM) 602 or a program loaded from a storage part 608 to a random access memory (RAM) 603. The RAM 603 further stores various programs and data required for operations of the system. The CPU 601, the ROM 602 and the RAM 603 are connected to each other through a bus 604. An input/output (I/O) interface 605 is also connected to the bus 604.

The following components are connected to the I/O interface 605: an input part 606 including a keyboard and a mouse; an output part 607 including a cathode-ray tube (CRT), a liquid crystal display (LCD) and a loudspeaker; a storage part 608 including a hard disk; and a communication part 609 including a network interface card such as a local area network (LAN) card or a modem. The communication part 609 executes communication processing via a network such as the Internet. A driver 610 may also be connected to the I/O interface 605 as required. A removable medium 611, such as a magnetic disk, an optical disc, a magneto-optical disc and a semiconductor memory, is installed on the driver 610 as required, such that a computer program read therefrom can be installed in the storage part 608 as required.

Particularly, according to the embodiments of the present invention, the process described above with reference to the flowchart may be implemented as a computer software program. For example, the embodiment of the present invention includes a computer program product, which includes a computer program carried by a computer readable medium. The computer program includes a program code for executing the method shown in the flowchart. In this embodiment, the computer program may be downloaded from a network by means of the communication part 609, and/or be downloaded from the removable medium 611. When the computer program is executed by the CPU 601, the functions defined in the method of the present invention are executed. It should be noted that the computer readable storage medium in the present invention may be a computer readable signal medium or a computer readable storage medium or a combination thereof. For example, the computer readable storage medium may be, but not limited to, electric, magnetic, optical, electromagnetic, infrared, or semiconductor system, apparatus or device, or any combination of the above. More specific embodiments of the computer readable storage medium may include, but not limited to: an electric connector with one or more wires, a portable computer magnetic disk, a hard drive, an RAM, an ROM, an erasable programmable read-only memory (EPROM or flash drive), an optical fiber, a compact disk read-only memory (CD-ROM), an optical storage device, a magnetic storage device, or any proper combination of the above. In the present invention, the computer readable storage medium may be any tangible medium including or storing a program, and the program may be used by or used in combination with an instruction execution system, apparatus or device. In the present invention, the computer readable signal medium may include a data signal propagated in a baseband or propagated as part of a carrier, and carries a computer readable program code. Such a propagated data signal may be in multiple forms, including, but not limited to, an electromagnetic signal, an optical signal, or any proper combination of the above. The computer readable signal medium may also be any computer readable storage medium except the computer readable medium. The computer readable storage medium may send, propagate or transmit a program used by or used in combination with an instruction execution system, apparatus or device. The program code contained in the computer readable medium may be transmitted by using any suitable medium, including, but is not limited to, radio, an electric wire, an optical fiber, radio frequency (RF), etc., or any proper combination of the above.

The computer program code for executing the operations in the present invention may be compiled by using one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including an LAN or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to the embodiments of the present invention. In this regard, each block in the flowcharts or block diagrams may represent a module, a program segment or a part of code, and the module, the program segment or the part of code includes one or more executable instructions for implementing specified logic functions. It should also be noted that, in some alternative implementations, functions marked in the blocks may also take place in an order different from the order marked in the accompanying drawings. For example, two consecutive blocks can actually be executed substantially in parallel, and they may sometimes be executed in a reverse order, which depends on the involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Terms such as "first" and "second" are intended to distinguish between similar objects, rather than to necessarily describe or indicate a specific order or sequence.

In addition, terms "include", "comprise" or any other variations thereof are intended to cover non-exclusive inclusions, such that a process, a method, an article, or a device/apparatus including a series of elements includes those elements, and also includes other elements that are not explicitly listed, or also includes inherent elements of the process, the method, the article or the device/apparatus.

The technical solutions of the present invention are described with reference to the preferred implementations and accompanying drawings. Those skilled in the art should easily understand that the protection scope of the present invention is apparently not limited to these specific implementations. Those skilled in the art can make equivalent changes or substitutions to the relevant technical features without departing from the principles of the present invention, and the changed or substituted technical solutions should fall within the protection scope of the present invention.

What is claimed is:

1. A control method for a flexible carbon cantilever beam actuated by a smart material, comprising the following steps:
   S10: acquiring an elastic displacement of the flexible carbon cantilever beam in real time as input data; and
   S20: obtaining, based on the input data, a control torque through a distributed parameter model constructed in advance, and performing vibration control on the flexible carbon cantilever beam;
   wherein, a method for constructing the distributed parameter model comprises:
   A10: calculating a tip rotation based on a displacement of one end of the flexible carbon cantilever beam and a length of the smart material strip, wherein a surface of the flexible carbon cantilever beam is attached by a smart material strip, wherein the smart material strip is bent due to an excitation voltage applied, and constructing a linear relationship model between the excitation voltage and the tip rotation through a black box model;

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip;

A30: calculating a kinetic energy, an elastic potential energy and a virtual work of the flexible carbon cantilever beam according to the kinetic model of the smart material strip, wherein the virtual work is done by a non-conservative force comprising no damping force, and constructing, in combination with a Hamilton's principle, an undamped distributed parameter model of the flexible carbon cantilever beam as a first model; and A40: calculating a virtual work done by the non-conservative force plus a viscous damping force and a structural damping force on the flexible carbon cantilever beam, and constructing, in combination with the first model, a damped distributed parameter model as the distributed parameter model.

2. The control method for the flexible carbon cantilever beam actuated by the smart material according to claim 1, wherein the tip rotation is calculated as follows:

$$\theta = 2\tan^{-1}\frac{d}{l}$$

wherein, $\theta$ represents the tip rotation, d represents the tip displacement, and l represents the length of the smart material strip.

3. The control method for the flexible carbon cantilever beam actuated by the smart material according to claim 2, wherein the kinetic model of the smart material strip is:

M=Kv $K=EI_c k_1/l$ wherein, M represents a torque output by the kinetic model of the smart material strip, v represents the excitation voltage, $EI_c$ represents a bending stiffness of the smart material strip, and $k_1$ is a set constant.

4. The control method for the flexible carbon cantilever beam actuated by the smart material according to claim 1, wherein the undamped distributed parameter model of the flexible carbon cantilever beam is:

$\rho(x)\ddot{w}(x,t)+[EI(x)w_{xx}(x,t)]_{xx}=[M(t)R(x)]_{xx}$ $EI(x)=EI_b+EI_c \cdot R(x)$ $$R(X) = \begin{cases} 0 & X < l_1 \text{ or } x \geq l_2 \\ 1 & l_1 \leq x < l_2 \end{cases}$$

wherein, $\rho(x)$ represents a unit mass density at a point x on the flexible carbon cantilever beam; $EI_b$ and $EI_c$ represent a bending stiffness of the flexible carbon cantilever beam and a bending stiffness of the smart material strip, respectively; M(t) represents a torque output by the kinetic model of the smart material strip at a moment t; $\ddot{w}(x,t)$ represents a second-order time derivative of an elastic displacement at the point x on the flexible carbon cantilever beam at the moment t; $w_{xx}(x,t)$ represents a second-order partial derivative of the elastic displacement at the point x on the flexible carbon cantilever beam at the moment t; $[\bullet]_{xx}$ represents a second-order displacement partial derivative of $\bullet$; $l_1$ or $l_2$ represents any position on the flexible carbon cantilever beam.

5. The control method for the flexible carbon cantilever beam actuated by the smart material according to claim 4, wherein a method for calculating the virtual work done by the non-conservative force plus the viscous damping force and the structural damping force on the flexible carbon cantilever beam in step A40 is as follows:

$$\delta W_{nc} = \int_0^L [M(t)R(x)]_{xx}\delta w(x,t)dx - D_1\int_0^L \dot{w}(x,t)\delta w(x,t)dx - D_2\int_0^L \dot{w}_x(x,t)\delta w(x,t)dx$$

wherein, $\delta W_{nc}$ represents a variation of the virtual work done by the non-conservative force plus the viscous damping force and the structural damping force; $D_1$ represents the viscous damping force; $D_2$ represents the structural damping force; $\delta w(x,t)$ represents a variation of the elastic displacement at the point x on the flexible carbon cantilever beam at the moment t; dx represents a differential of a displacement; $\dot{w}(x,t)$ represents a time derivative of the elastic displacement at the point x on the flexible carbon cantilever beam at the moment t; $\dot{w}_x(x,t)$ is a first-order partial derivative of $\dot{w}(x,t)$; L represents a length of the flexible carbon cantilever beam.

6. The control method for the flexible carbon cantilever beam actuated by the smart material according to claim 5, wherein the damped distributed parameter model is: $\rho(x)\ddot{w}(x,t)+[EI(x)w_{xx}(x,t)]_{xx}+D_1\dot{w}(x,t)+D_2\dot{w}_x(x,t)=[M(t)R(x)]_{xx}$.

7. A storage device, wherein a plurality of programs are stored in the storage device, and the plurality of programs are configured to be loaded and executed by a processor to implement the control method for the flexible carbon cantilever beam actuated by the smart material according to claim 1.

8. The storage device according to claim 7, wherein the tip rotation is calculated as follows:

$$\theta = 2\tan^{-1}\frac{d}{l}$$

wherein, $\theta$ represents the tip rotation, d represents the tip displacement, and l represents the length of the smart material strip.

9. The storage device according to claim 8, wherein the kinetic model of the smart material strip is:

M=Kv $K=EI_c k_1/l$ wherein, M represents a torque output by the kinetic model of the smart material strip, v represents the excitation voltage, $EI_c$ represents a bending stiffness of the smart material strip, and $k_1$ is a set constant.

10. The storage device according to claim 7, wherein the undamped distributed parameter model of the flexible carbon cantilever beam is:

$$\rho(x)\ddot{w}(x,t)+[EI(x)w_{xx}(x,t)]_{xx}=[M(t)R(x)]_{xx}$$

$$EI(x)=EI_b+EI_c \cdot R(x)$$

$$R(X) = \begin{cases} 0 & X < l_1 \text{ or } x \geq l_2 \\ 1 & l_1 \leq x < l_2 \end{cases}$$

wherein, $\rho(x)$ represents a unit mass density at a point x on the flexible carbon cantilever beam; $EI_b$ and $EI_c$ represent a bending stiffness of the flexible carbon cantilever beam and a bending stiffness of the smart material strip, respectively; $M(t)$ represents a torque output by the kinetic model of the smart material strip at a moment t; $\ddot{w}(x,t)$ represents a second-order time derivative of an elastic displacement at the point x on the flexible carbon cantilever beam at the moment t; $w_{xx}(x,t)$ represents a second-order partial derivative of the elastic displacement at the point x on the flexible carbon cantilever beam at the moment t; $[M(t)R(x)]_{xx}$ represents a second-order displacement partial derivative of $M(t)R(x)$; $l_1$ or $l_2$ represents any position on the flexible carbon cantilever beam.

11. The storage device according to claim 10, wherein a method for calculating the virtual work done by the non-conservative force plus the viscous damping force and the structural damping force on the flexible carbon cantilever beam in step A40 is as follows:

$$\delta W_{nc} = \int_0^L [M(t)R(x)]_{xx}\delta w(x,t)dx - D_1\int_0^L \dot{w}(x,t)\delta w(x,t)dx - D_2\int_0^L \dot{w}_x(x,t)\delta w(x,t)dx$$

wherein, $\delta W_{nc}$ represents a variation of the virtual work done by the non-conservative force plus the viscous damping force and the structural damping force; $D_1$ represents the viscous damping force; $D_2$ represents the structural damping force; $\delta w(x,t)$ represents a variation of the elastic displacement at the point x on the flexible carbon cantilever beam at the moment t; dx represents a differential of a displacement; $\dot{w}(x,t)$ represents a time derivative of the elastic displacement at the point x on the flexible carbon cantilever beam at the moment t; $\dot{w}w_x(x,t)$ is a first-order partial derivative of $\dot{w}(x,t)$; L represents a length of the flexible carbon cantilever beam.

12. The storage device according to claim 11, wherein the damped distributed parameter model is: $\rho(x)\ddot{w}(x,t)+[EI(x)w_{xx}(x,t)]_{xx}+D_1\dot{w}(x,t)+D_2\dot{w}_x(x,t)=[M(t)R(x)]_{xx}$.

13. A processing device, comprising a processor and a storage device, wherein the processor is configured to execute each program of a plurality of programs; the storage device is configured to store the plurality of programs; the plurality of programs are configured to be loaded and executed by the processor to implement the control method for the flexible carbon cantilever beam actuated by the smart material according to claim 1.

14. The processing device according to claim 13, wherein the tip rotation is calculated as follows:

$$\theta = 2\tan^{-1}\frac{d}{l}$$

wherein, $\theta$ represents the tip rotation, d represents the tip displacement, and l represents the length of the smart material strip.

15. The processing device according to claim 14, wherein the kinetic model of the smart material strip is:

$$M=Kv$$

$$K=EI_c k_1/l$$

wherein, M represents a torque output by the kinetic model of the smart material strip, v represents the excitation voltage, $EI_c$ represents a bending stiffness of the smart material strip, and $k_1$ is a set constant.

16. The processing device according to claim 13, wherein the undamped distributed parameter model of the flexible carbon cantilever beam is:

$$\rho(x)\ddot{w}(x,t)+[EI(x)w_{xx}(x,t)]_{xx}=[M(t)R(x)]_{xx}$$

$$EI(x)=EI_b+EI_c \cdot R(x)$$

$$R(X) = \begin{cases} 0 & X < l_1 \text{ or } x \geq l_2 \\ 1 & l_1 \leq x < l_2 \end{cases}$$

wherein, $\rho(x)$ represents a unit mass density at a point x on the flexible carbon cantilever beam; $EI_b$ and $EI_c$ represent a bending stiffness of the flexible carbon cantilever beam and a bending stiffness of the smart material strip, respectively; $M(t)$ represents a torque output by the kinetic model of the smart material strip at a moment t; $\ddot{w}(x,t)$ represents a second-order time derivative of an elastic displacement at the point x on the flexible carbon cantilever beam at the moment t; $w_{xx}(x,t)$ represents a second-order partial derivative of the elastic displacement at the point x on the flexible carbon cantilever beam at the moment t; $[M(t)R(x)]_{xx}$ represents a second-order displacement partial derivative of $M(t)R(x)$; $l_1$ or $l_2$ represents any position on the flexible carbon cantilever beam.

17. The processing device according to claim 16, wherein a method for calculating the virtual work done by the non-conservative force plus the viscous damping force and the structural damping force on the flexible carbon cantilever beam in step A40 is as follows:

$$\delta W_{nc} = \int_0^L [M(t)R(x)]_{xx}\delta w(x,t)dx - D_1\int_0^L \dot{w}(x,t)\delta w(x,t)dx - D_2\int_0^L \dot{w}_x(x,t)\delta w(x,t)dx$$

wherein, $\delta W_{nc}$ represents a variation of the virtual work done by the non-conservative force plus the viscous damping force and the structural damping force; $D_1$ represents the viscous damping force; $D_2$ represents the structural damping force; $\delta w(x,t)$ represents a variation of the elastic displacement at the point x on the flexible carbon cantilever beam at the moment t; dx represents a differential of a displacement; $\dot{w}(x,t)$ represents a time derivative of the elastic displacement at the point x on the flexible carbon cantilever beam at the moment t; $\dot{w}_x(x,t)$ is a first-order partial derivative of $\dot{w}(x,t)$; L represents a length of the flexible carbon cantilever beam.

18. The processing device according to claim 17, wherein the damped distributed parameter model is: $\rho(x)\ddot{w}(x,t)+[EI(x)w_{xx}(x,t)]_{xx}+D_1\dot{w}(x,t)+D_2\dot{w}_x(x,t)=[M(t)R(x)]_{xx}$.

19. A control system for a flexible carbon cantilever beam actuated by a smart material, comprising an acquisition module and a control module; wherein the acquisition module is configured to acquire an elastic displacement of the flexible carbon cantilever beam in real time as input data;

the control module is configured to obtain, based on the input data, a control torque through a distributed parameter model constructed in advance, and perform vibration control on the flexible carbon cantilever beam;

wherein, a method for constructing the distributed parameter model comprises:

A10: calculating a tip rotation based on a displacement of one end of the flexible carbon cantilever beam and a length of the smart material strip, wherein a surface of the flexible carbon cantilever beam is attached by a smart material strip, wherein the smart material strip is bent due to an excitation voltage applied, and constructing a linear relationship model between the excitation voltage and the tip rotation through a black box model;

A20: obtaining a mapping relationship between the excitation voltage and a bending moment of the smart material strip according to a relationship between a curvature radius of a neutral layer and the bending moment when the flexible carbon cantilever beam is bent and in combination with the linear relationship model, and constructing a kinetic model of the smart material strip;

A30: calculating a kinetic energy, an elastic potential energy and a virtual work of the flexible carbon cantilever beam according to the kinetic model of the smart material strip, wherein the virtual work is done by a non-conservative force comprising no damping force, and constructing, in combination with a Hamilton's principle, an undamped distributed parameter model of the flexible carbon cantilever beam as a first model; and A40: calculating a virtual work done by the non-conservative force plus a viscous damping force and a structural damping force on the flexible carbon cantilever beam, and constructing, in combination with the first model, a damped distributed parameter model as the distributed parameter model.

* * * * *